(12) United States Patent
Nesbit (10) Patent No.: US 10,850,457 B2
(45) Date of Patent: Dec. 1, 2020

(54) ACTUATABLE FLOW MEDIA

(71) Applicant: The Boeing Company, Chicago, IL (US)

(72) Inventor: Ashleigh Raoul Nesbit, Williamstown (AU)

(73) Assignee: The Boeing Company, Chicago, IL (US)

( * ) Notice: Subject to any disclaimer, the term of this patent is extended or adjusted under 35 U.S.C. 154(b) by 467 days.

(21) Appl. No.: 15/655,178

(22) Filed: Jul. 20, 2017

(65) Prior Publication Data
US 2018/0056612 A1    Mar. 1, 2018

(30) Foreign Application Priority Data

Aug. 29, 2016   (AU) .................................. 2016222309

(51) Int. Cl.
*B29C 70/44* (2006.01)
*B29C 70/54* (2006.01)
*F16K 7/20* (2006.01)

(52) U.S. Cl.
CPC ............ *B29C 70/548* (2013.01); *B29C 70/44* (2013.01); *B29C 70/443* (2013.01); *B29C 70/547* (2013.01); *F16K 7/20* (2013.01)

(58) Field of Classification Search
CPC ...... B29C 70/44; B29C 70/443; B29C 70/548
See application file for complete search history.

(56) References Cited

U.S. PATENT DOCUMENTS

| | | | |
|---|---|---|---|
| 3,095,904 A | 7/1963 | Thaning | |
| 4,872,638 A * | 10/1989 | Thompson | F16K 31/1262 251/54 |
| 5,665,301 A | 9/1997 | Alanko | |
| 2005/0035478 A1 * | 2/2005 | Sewell | B29C 70/443 264/102 |
| 2014/0328690 A1 | 11/2014 | Kybelund | |

FOREIGN PATENT DOCUMENTS

DE     1047558 B     12/1958
WO     2004013524 A1    2/2004

OTHER PUBLICATIONS

Search Report for related European Application No. EP17187671.7; report dated Feb. 15, 2018.

* cited by examiner

*Primary Examiner* — Matthew J Daniels
(74) *Attorney, Agent, or Firm* — Miller, Matthias & Hull LLP (57) ABSTRACT

An actuatable flow media for the control of a flow rate of a liquid through the flow media, the actuatable flow media comprising a base having at least one cavity formed therein, at least one aperture formed in the cavity defining a liquid flow path for the entry of liquid into or exit of liquid from the flow media; a flexible membrane arranged in spaced relation with the base and defining a liquid flow path through the flow media; and an elastically deformable element arranged in the cavity and extending between the base and the flexible membrane for actuation between at least a first configuration in which the element is substantially undeformed and the liquid flow path through the at least one aperture is open and a second configuration in which the element is substantially deformed and the liquid flow path through the at least one aperture is closed.

20 Claims, 8 Drawing Sheets

ACTUATABLE FLOW MEDIA

FIELD

The present disclosure generally relates to the fabrication of composite structures and in particular relates to an composite preform actuatable flow media and actuatable flow media system, to a method of controlling a flow rate of a liquid entering a volumetric space from a liquid supply, and to a method of resin infusion and to a composite component.

BACKGROUND

A current method for fabricating composite structures utilises a resin infusion process to infuse a composite preform, formed of multiple plies formed of composite fibres, with resin prior to curing of the resin to form a composite structure. According to a current method, the composite preform and a peel ply layer is located on a tool surface and a vacuum bagging film is placed over the tool surface to cover the composite preform and peel ply and sealed to form a sealed chamber between the tool surface and vacuum bagging film. Resin is infused through the composite preform by application of vacuum pressure to a downstream end of the sealed chamber, drawing resin from an upstream resin supply through the composite preform. Once the resin has been infused throughout the preform, the entire assembly is heated, typically in an oven, to cure the resin and thus form the composite structure.

Resin supply to the composite preform is provided via one or more resin supply pipes that is connected to the tool surface at a resin inlet fitting. The flow rate of resin into the resin inlet fitting is controlled at a resin inlet valve disposed in the resin supply pipe. The resin inlet valve is typically a mechanical valve that becomes filled with resin during the resin infusion process. The resin inlet valve is typically used for a single resin infusion process and is then removed from the resin supply pipe, disassembled and thoroughly cleaned prior to being reused in a further resin infusion process. This process can be time consuming and laborious.

During the resin infusion process, resin infuses through the composite preform with a wavefront that may or may not progress evenly across the lateral extent of the composite preform. It is important to ensure that the entire preform is infused. Highly integrated complex dry fiber preforms can have areas that are less permeable than other areas of the preform due to the geometry of the preform or to the configuration of the fibers. The resin does not always fill these parts completely. As the resin cures, the resulting composite component at these parts is consequently deficient or incomplete.

In composite preforms having a relatively simple geometry, a consumable flow media such as a mesh or fabric is placed on top of the peel ply to help promote resin flowing through all sections of the composite preform. However, this approach is not always successful, particularly for complex preform geometries.

The present disclosure is made bearing the above problems in mind.

SUMMARY

The present disclosure is generally directed to an elastically deformable, actuatable flow media and actuatable flow media system, to a method of controlling a flow rate of a liquid entering a volumetric space from a liquid supply, to a method of resin infusion and to a composite component. According to embodiments, an actuatable flow media is provided. In some embodiments, the actuatable flow media is positioned on the resin supply inlet so as to control the flow rate of resin flowing into a resin infusion chamber. In some embodiments, the actuatable flow media is positioned on a composite preform above a permeable layer so as to control the flow rate of resin flowing through the actuatable flow media and into the composite preform.

According to a first aspect, the present disclosure provides an actuatable flow media for the control of a flow rate of a liquid through the flow media. The flow media has a base having at least one cavity formed therein and at least one aperture formed in the cavity defining a liquid flow path for the entry of liquid into or exit of liquid from the flow media. The flow media further includes a flexible membrane arranged in spaced relation with the base and defining a liquid flow path through the flow media. An elastically deformable element is arranged in the cavity and extends between the base and the flexible membrane for actuation between at least a first configuration in which the elastically deformable element is substantially undeformed and the liquid flow path through the at least one aperture is open and a second configuration in which the elastically deformable element is substantially deformed and the liquid flow path through the at least one aperture is closed.

According to a second aspect, the present disclosure provides an actuatable flow media system. The system comprises an actuatable flow media in accordance with the first aspect and a control element for selectively applying pressure to the flexible membrane and the elastically deformable element of the flow media to vary the elastically deformable element configuration between at least the first configuration and the second configuration to thereby control a flow rate of a liquid flowing through the flow media.

According to a third aspect, the present disclosure provides a method of controlling a flow rate of a liquid entering a volumetric space from a liquid supply using an actuatable flow media. The actuatable flow media comprises a base having at least one cavity formed therein, at least one aperture formed in the cavity defining a pathway therethrough for the passage of liquid into or from the actuatable flow media, and an elastically deformable element arranged in the cavity for actuation between at least a first configuration in which the capsule is substantially undeformed and the liquid flow path through the at least one aperture is open and a second configuration in which the capsule is substantially deformed and the liquid flow path through the at least one aperture is closed. The method comprises positioning the actuatable flow element in a flow pathway between the liquid supply and the volumetric space, and selectively actuating the flow media to either deform the elastically deformable element to at least partially close the pathway of the liquid through the aperture and into the flow media or to release pressure on the elastically deformable element to at least partially open the pathway of the liquid through the at least one aperture, through the flow media and into the volumetric space.

According to a fourth aspect, the present disclosure provides a method of infusing resin into a composite preform. A tool having an upper tool surface is provided. A composite preform is positioned on the tool surface and a permeable film is positioned on the composite preform. A vacuum bagging film is placed over the tool surface to cover the composite preform and permeable film. The vacuum bagging film is then sealed relative to the tool surface to define a sealed resin infusion chamber between the tool surface and the vacuum bagging film. A resin supply having a resin supply inlet is provided and an actuatable flow media according to the first aspect is positioned on the resin supply inlet such that at least one aperture of the flow media is located over the resin supply inlet, providing a resin flow path from the resin supply to the resin infusion chamber through the actuatable flow media. The flow media is actuated to selectively close and open the liquid flow path through the at least one aperture of the flow media so as to control the flow rate of resin flowing into the resin infusion chamber. At least partial vacuum pressure is applied to the resin infusion chamber to draw resin from the resin supply through the resin flow path, infusing the composite preform with resin.

According to a fifth aspect, the present disclosure provides a method of infusing resin into a composite preform. A tool having an upper tool surface is provided. A composite preform is positioned on the tool surface and a permeable film is positioned on the composite preform. An actuatable flow media according to the first aspect is positioned on the permeable film. The vacuum bagging film is then sealed relative to the tool surface to define a sealed resin infusion chamber between the tool surface and the vacuum bagging film, covering the composite preform, permeable film and actuatable flow media. A resin supply is provided, providing a resin flow path from the resin supply to the resin infusion chamber, through the actuatable flow media and through the composite preform to a resin outlet. At least partial vacuum pressure is applied to the resin outlet to draw resin from the resin supply through the resin flow path, infusing the composite preform with resin. The flow media is then actuated to selectively close and open the at least one aperture of the flow media so as to control the flow rate of resin flowing through the actuatable flow media and into the composite preform.

The features that have been discussed can be achieved independently in various embodiments or may be combined in yet other embodiments, further details of which can be seen with reference to the following description and drawings.

DETAILED DESCRIPTION

The following detailed description is intended to provide both devices and methods for carrying out the disclosure. Actual scope of the disclosure is defined by the appended claims.

Apparatus and methods according to exemplary embodiments of the present disclosure will now be described in detail. In general, the present disclosure provides an actuatable flow media for the control of a flow rate of a liquid through the flow media. The flow media has a base having at least one cavity formed therein and at least one aperture formed in the cavity defining a liquid flow path for the entry of liquid into or exit of liquid from the flow media. The flow media further includes a flexible membrane arranged in spaced relation with the base and defining a liquid flow path through the flow media. An elastically deformable capsule is arranged in the cavity and extends between the base and the flexible membrane for actuation between at least a first configuration in which the capsule is substantially undeformed and the liquid flow path through the at least one aperture is open and a second configuration in which the capsule is substantially deformed and the liquid flow path through the at least one aperture is closed. The actuatable flow media may be placed over a resin supply inlet during a resin infusion process of a composite preform, for the control of the flow rate of resin entering into the composite preform. The actuatable flow media may alternatively or additionally be placed within the lay up for the control of a flow rate of resin passing through a particular location within the lay up. The resulting resin infused composite preform is then cured, typically within a heated oven, to form a composite component.

Now referring to FIGS. 1 to 3 of the accompanying drawings, a first embodiment of a system 100 for resin infusion of a composite preform will now be described. The resin infusion system 100 has a dry composite preform 10 having an upper surface 14 and an opposing lower surface 15. The composite preform 10 is to be infused with an exothermically curing resin provided in a resin supply 141.

Figure 1:
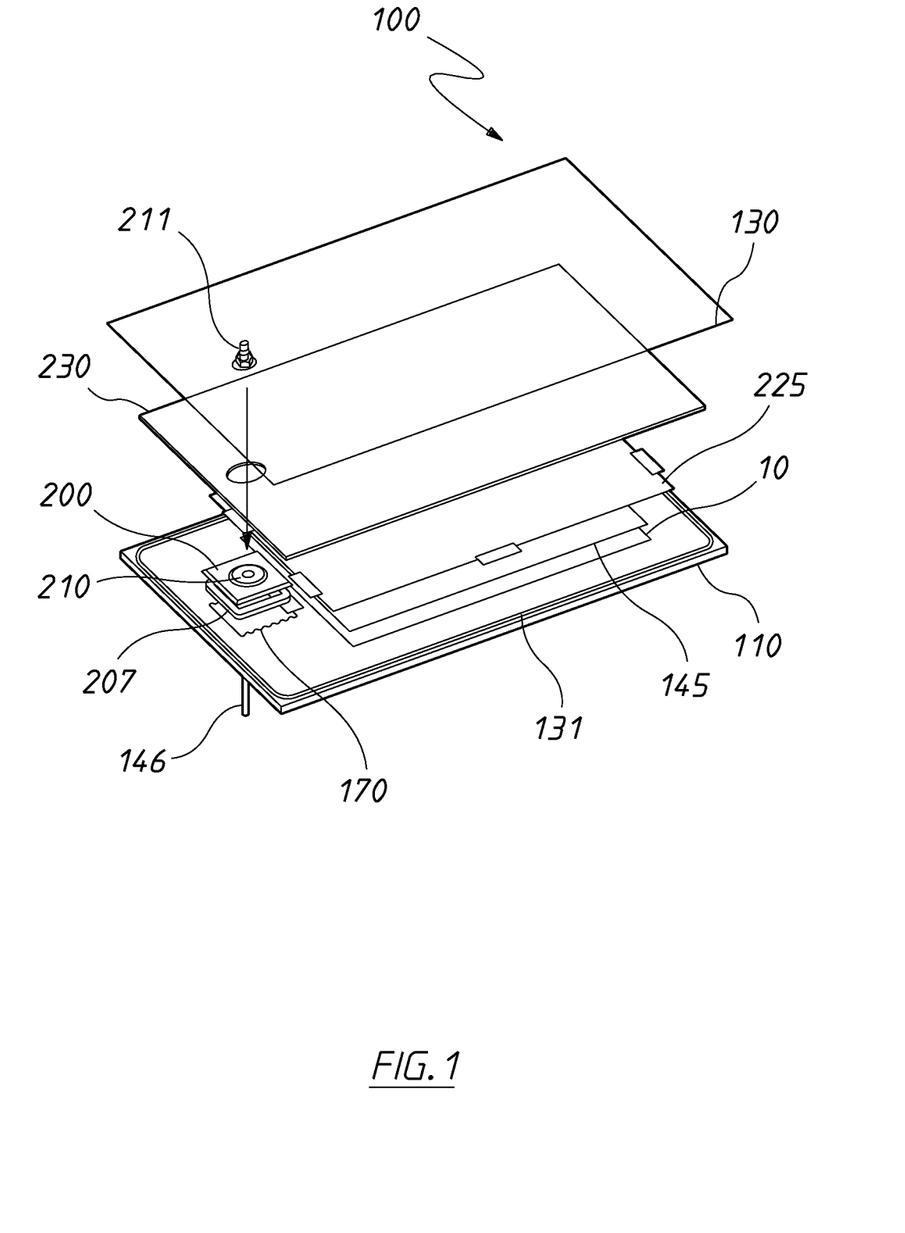
FIG. 1 is a schematic exploded isometric view of a first embodiment of a system for resin infusion of a composite preform.
Figure 2:
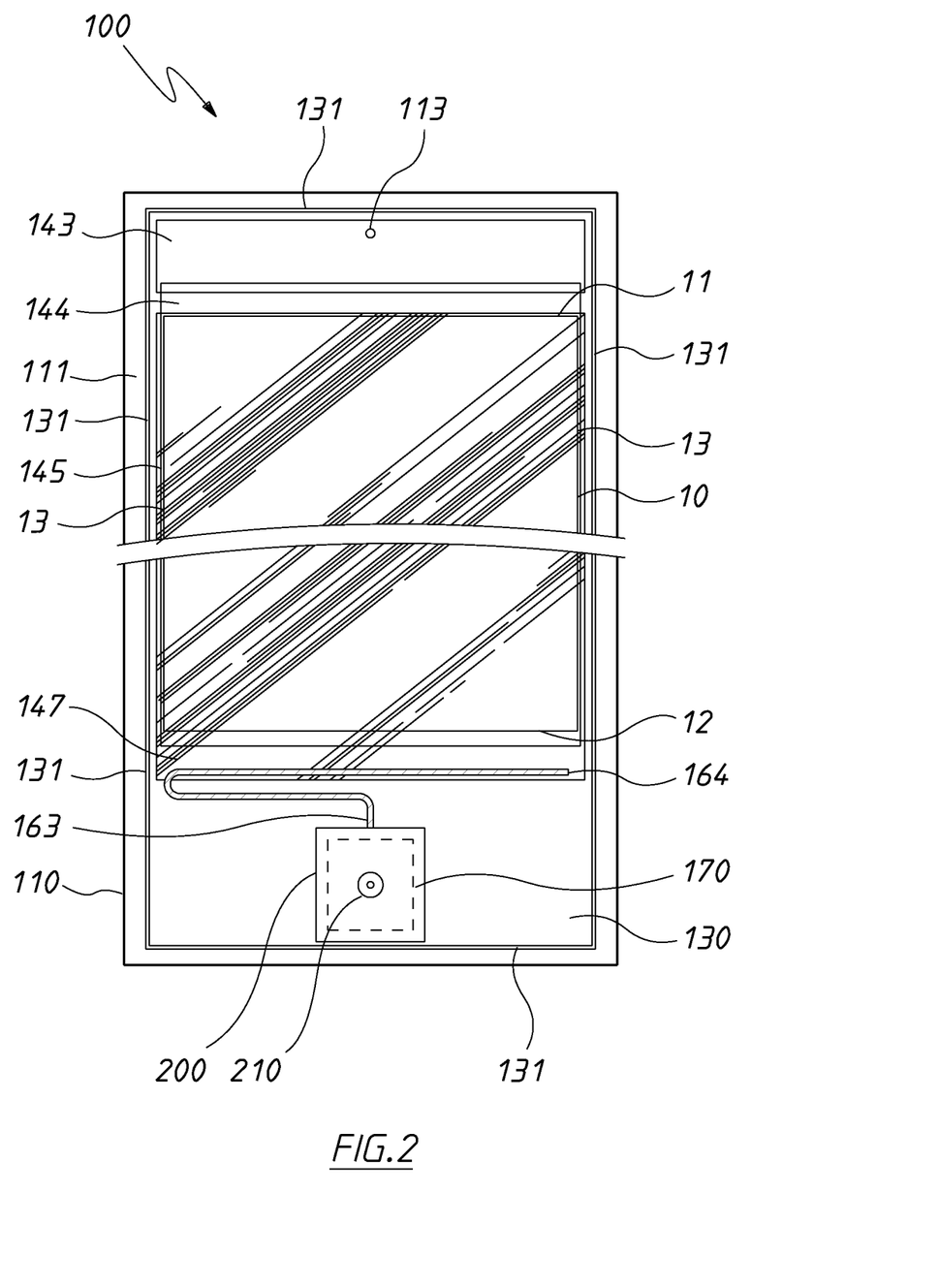
FIG. 2 is a schematic plan view of the system for resin infusion of a composite preform of FIG. 1.
Figure 3:
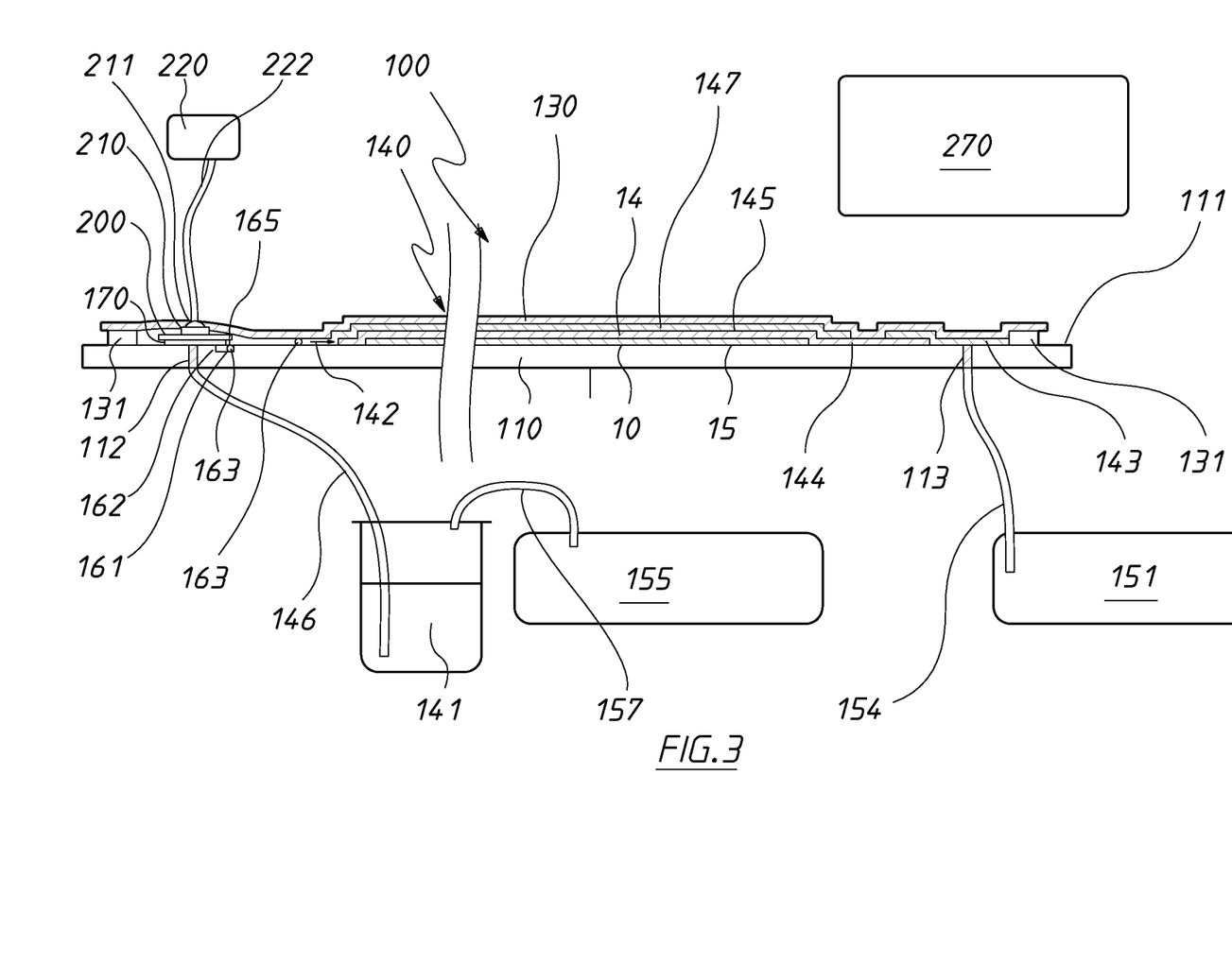
FIG. 3 is a schematic cross-sectional view of the system for resin infusion of a composite preform of FIG. 1.
Figure 4:
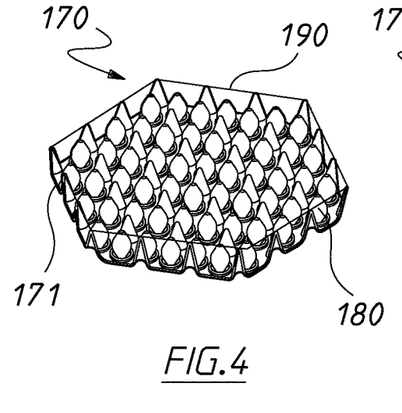
FIG. 4 is an isometric schematic view of a portion of an actuatable flow media.
Figure 5:
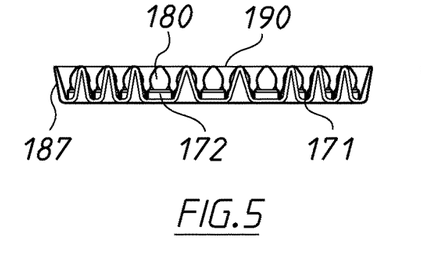
FIG. 5 is a side schematic view of the actuatable flow media of FIG. 4.
Figure 6:
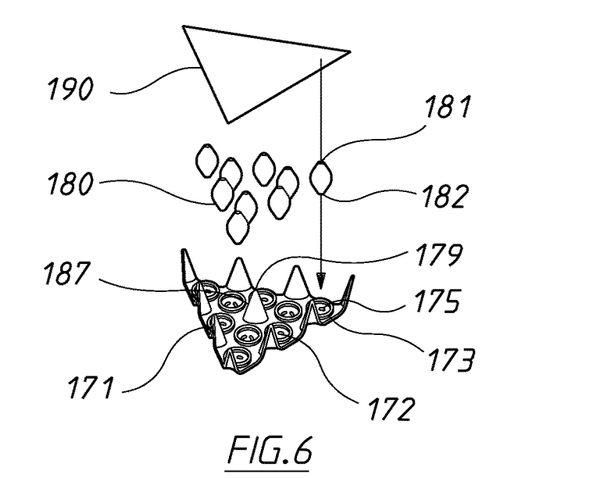
FIG. 6 is an exploded schematic view of the actuatable flow media of FIG. 4.

The system shown in FIGS. 1 to 3 is of a single vacuum bag composite layup configuration. In this configuration, the resin infusion system 100 has a tool 110 having an upper tool surface 111, with the lower surface 15 of the composite preform 10 being located on the tool surface 111. A vacuum bagging film 130 extends over the composite preform 10 and is sealed relative to the tool surface 111 to define a sealed first cavity 140 between the vacuum bagging film 130 and the tool surface 111. The composite preform 10 is located in the first cavity 140. It is also envisaged that a second vacuum bagging film covering the first vacuum bagging film can be used to minimise possible air permeation through the single vacuum bagging film as vacuum is applied during the curing process.

The tool 110 may be formed of any of various structural materials, including mild steel, stainless steel, invar or a carbon composite material that will maintain its form at elevated temperatures associated with curing, so as to provide a geometrically stable tool surface 111 though the resin curing process. The tool surface 111 may be substantially flat for the production of composite structures having a substantially flat lower surface, such as wing or fuselage skin panels, or otherwise shaped as desired so as to provide a shaped surface of a non-planar composite structure.

The composite preform 10 may take any form suitable for resin infusion and as dictated by the geometric and structural requirements of the laminated composite structure to be fabricated. In the embodiment of FIGS. 1 to 3, the composite preform 10 comprises a layup of multiple plies of reinforcing material, each formed of woven or braided fibres and/or chopped strand mat. The preform plies may be formed of any of various reinforcing fibres, such as carbon, graphite, glass, aromatic polyamide or any other suitable material for fabricating a resin reinforced laminated composite structure. The plies form a dry composite preform 10, without any resin. The composite preform 10 is located on the tool surface 111 with the lower surface 15 of the preform 10 oriented on the tool surface 111 such that the lower surface of the resulting cured composite structure will match the form of the tool surface 111. The composite preform 10 located on the tool surface 111 has a laterally extending downstream edge 11, an opposing laterally extending upstream edge 12 and opposing longitudinally extending side edges 13. In the context of the present specification, upstream and downstream sides of the composite preform 10 are identified with reference to the direction of flow of resin, as will be further described. The preform 10 may take any desired shape corresponding to the shape of the laminated composite structure to be formed.

The composite preform 10 may have a uniform thickness as depicted in the first embodiment of FIGS. 1 to 3, or it may have a locally non-uniform thickness as measured between the upper and lower surfaces 14, 15.

The resin supply 141 communicates with the first cavity 140 through one or more resin infusion inlets 112 extending through the tool 110 on the upstream side of the composite preform 10, via one or more resin supply pipes 146. The resin supply pipes 146 are typically formed of copper or other tubing material such as steel, stainless steel or glass. A first vacuum source 151 communicates with the first cavity 140 through one or more vacuum outlets 113 extending through the tool 110 on a downstream side of the composite preform 10, via one or more vacuum outlet pipes 154, which are also typically formed of copper but may also be formed of other tubing material such as steel, stainless steel or glass. In the embodiment depicted, the resin supply 141 also communicates with a second vacuum source 155 via a second vacuum pipe 157.

A resin flow path 142 extends from the resin supply 141, through the first cavity 140, the composite preform 10 and to the first vacuum source 151. An upstream portion of the resin flow path 142 comprises the resin supply pipe(s) 146 and resin infusion inlet 112 extending through the tool 110 and an actuatable flow media pad 170 and a length of nylon flexible infusion spiral 163. A groove 161 is machined into the tool surface 111 adjacent the resin infusion inlet 112. A first end 162 of the length of flexible infusion spiral 163 is received in the groove 161, whilst the other, second end 164 of the flexible infusion spiral 163 is positioned within the lay up materials as described below. A plate 165 is placed over the flexible infusion spiral 163 and secured in place with one or more strips of sealing tape (not shown), leaving the first end 162 of the flexible infusion spiral 163 free adjacent the resin infusion inlet 112. The plate 165 is made of aluminium or steel, stainless steel, invar or fibre reinforced plastic, provided it is capable of withstanding resin infusion process temperatures and pressures. The actuatable flow media pad 170 is positioned over the resin infusion inlet 112 such that it also extends over the first end 162 of the flexible infusion spiral 163 and the majority of the plate 165. As an alternative to the flexible infusion spiral 163, stacked strips of flow media (not shown) may also be used.

Referring to FIGS. 4 to 10, the actuatable flow media pad 170 comprises a semi-rigid base 171 fabricated from nylon or other suitable material such as acrylon butadiene styrene or polyactic acid, and having a pattern of circular cavities 172 formed therein. An elastically deformable element in the form of a capsule 180 is disposed in each of the cavities 172. Each circular cavity 172 is separated by a structural support element 187 that extends upwardly away from the base 171 to support a flexible membrane 190 that lies in spaced relation with the base 171. The base 171 can be of any size and shape appropriate to the particular application of the actuatable flow media pad 170. In FIGS. 1 to 3 the actuatable flow media pad 170 is depicted as being square in plan view, however it may be rectangular or polygonal as shown in FIGS. 4, 5 and 7 to 10, or any other suitable profile depending on the shape of the 'pad-up' area at which it is applied.

Figure 7:
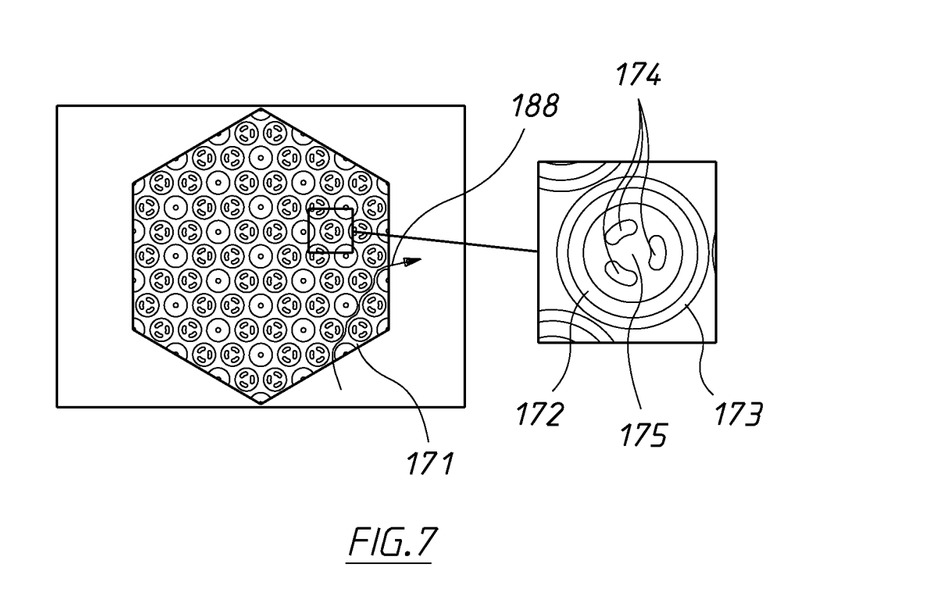
FIG. 7 is a plan view of a portion of the actuatable flow media of FIG. 4.

The circular cavity 172, best seen in FIG. 7 comprises an annular sealing lip 173 that is raised from the base 171 and within which are three equi-spaced ports or apertures 174 extending through the base 171. The apertures 174 form a pathway through the base 171 and surround a capsule bonding portion 175 of the cavity 172.

Figure 8:
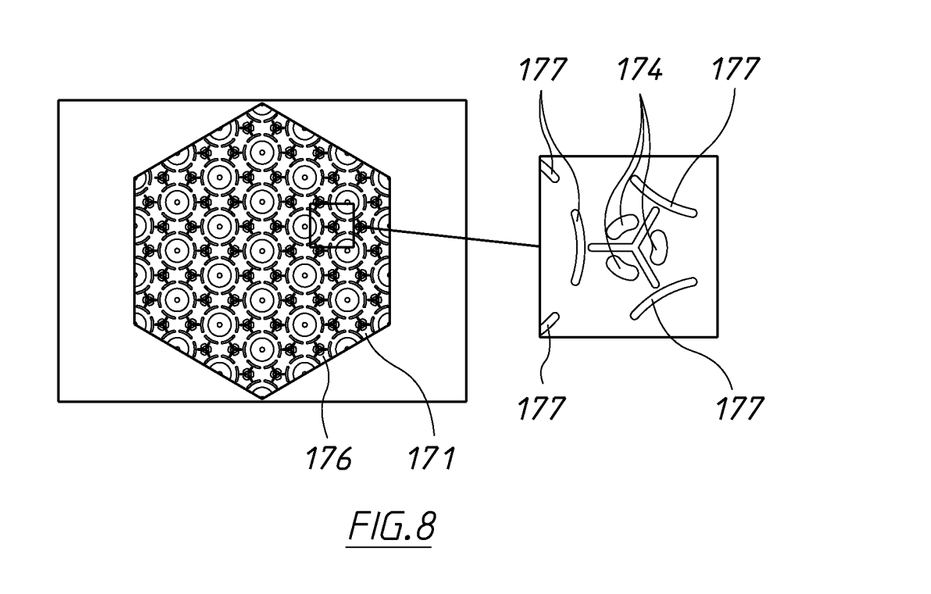
FIG. 8 is an underside view of a portion of the actuatable flow media of FIG. 4.
Figure 9:
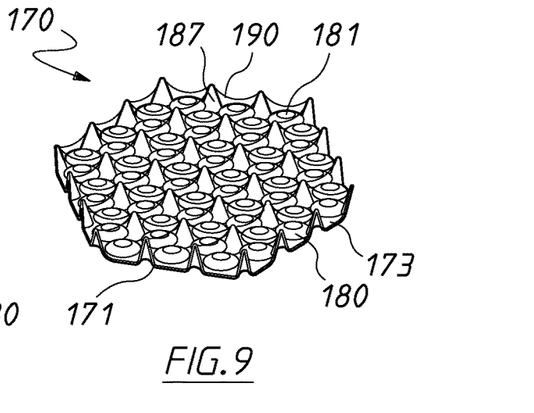
FIG. 9 is an isometric schematic view of a portion of the actuatable flow media in a compressed configuration.
Figure 10:
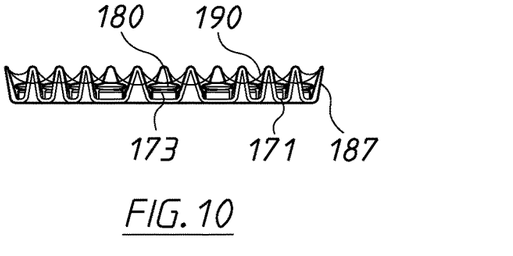
FIG. 10 is a side schematic view of the actuatable flow media in a compressed configuration.

An underside 176 of the base 171 is shown in FIG. 8 to have a number of scored grooves or impressions 177 therein for the purpose of imparting flexibility to the semi-rigid base. This feature can be beneficial when draping the actuated flow media over a surface that is not completely flat. The grooves or impressions 177 are separated from each other and are specifically not interlinked so as to not provide an alternative pathway for resin flow or vacuum during the resin infusion process.

The elastically deformable capsule 180 is generally ovoid in shape, narrowing at a top end 181 and a bottom end 182 thereof. The capsule 180 is made of a silicone or other elastic material that is elastically deformable under pressure. The bottom end 182 is bonded to the capsule bonding portion 175 of the cavity 172. The top end 181 is bonded to the flexible membrane 190. An elastically deformable capsule 180 is disposed in each cavity 172 of the base 171. The capsules 180 are spaced from one another and from the structural support elements 187 sufficiently to form horizontal pathways 188 through the flow media pad 170 (seen in FIGS. 7 and 12).

The flexible membrane 190 comprises a layer of nylon film or other suitable material that can endure the typically high curing temperatures (where necessary) of a resin infusion process and which is stretchable. For example, the flexible membrane might also be made from other stretchable polymer films such as PTFE or thin rubber films such as silicone. It will be understood that the actuatable flow media pad 170 may be used in resin infusion systems that cure at lower temperatures such that the material of the flexible membrane 190 is not limited to materials than can endure high curing temperatures. The flexible membrane 190 is bonded to a top end of the structural support elements 187 that are disposed at the same height as the top end 181 of the elastically deformable capsules 180 in their natural, i.e. uncompressed, state. The flexible membrane 190 extends over the extent of the actuatable flow media pad 170.

The structural support elements 187 are generally conical elements that are integrally formed with the base 171 and which are broadest at the base 171, narrowing to a tip 179 at an upper end thereof. The tip 179 is bonded to the flexible membrane 190.

In the undeformed state of the capsule 180, the apertures 174 in the base 171 are open. However, under an externally applied air pressure, the cross sectional area of the capsule 180 expands to fill the cavity 172, sealing over the apertures 174 and removing the pathway through the base 171. The deformed capsule 180 also expands to create a seal between itself and the structural support elements 187 adjacent to it, cutting off the horizontal pathways 188 through the actuatable flow media pad 170. The actuatable flow media pad 170 therefore forms a compressible flow media that can be actuated between at least a first configuration, in which the elastically deformable capsule 180 is undeformed and the flow media pad 170 is highly permeable and a second configuration in which the elastically deformable capsule 180 is compressed under externally applied pressure and the flow media pad 170 is impermeable. The permeability of the actuatable flow media pad 170 can be controlled as desired between the first and second configurations and to any degree of permeability of the actuatable flow media pad 170 between the first and second configurations to selectively prevent or admit resin flow therethrough.

Figure 11:
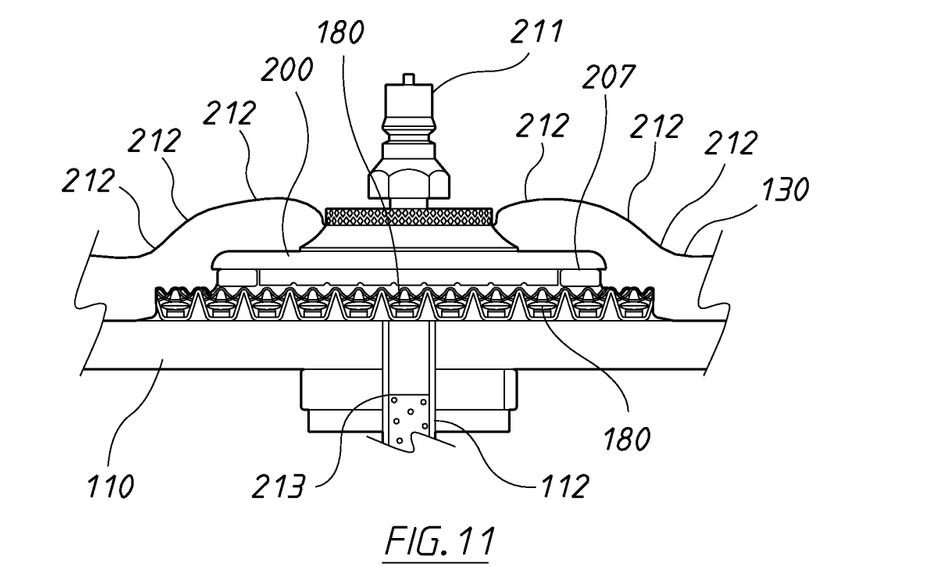
FIG. 11 is a schematic cross-section of an actuatable flow media system in a compressed configuration.
Figure 12:
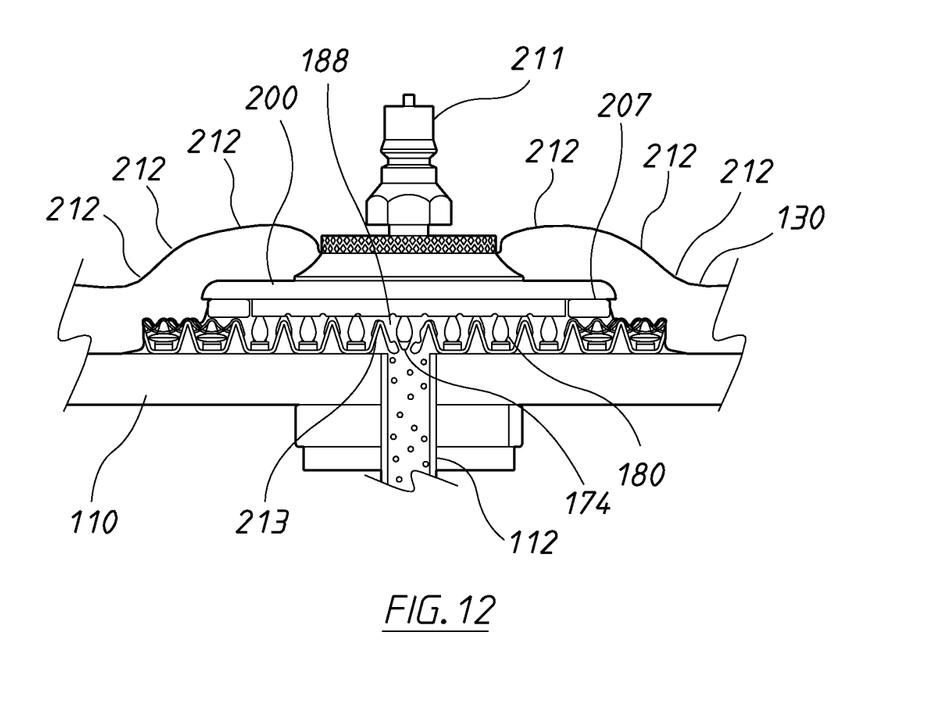
FIG. 12 is a schematic cross-section of the actuatable flow media system in an uncompressed configuration.

The actuatable flow media pad 170 is actuated via a control plate 200 disposed on top of the actuatable flow media pad 170 and bonded thereto with mastic 207 or other suitable adhesive. The control plate 200 comprises a plate of slightly larger size and shape as the actuatable flow media pad 170 and includes a mounting pad 210 on an upper side thereof for receiving a bayonet fitting 211 integral with or attached thereto for the application of an external supply of pressurised air 220 to the control plate 200 during use. The bayonet fitting 211 is connected to a high temperature hose 222 that is also connected to an external supply of pressurised air 220. The control plate 200 is typically made of mild steel, aluminium, stainless steel, invar or fibre reinforced plastic material. As shown in FIG. 11, a lower surface of the control plate 200 seals to a ribbon of the mastic 207 applied to the upper surface of the actuatable flow media pad 170 to form a sealed chamber therebetween. Applying a high pressure through the control plate 200 causes the flexible membrane 190 and the capsules 180 to compress into a deformed state, sealing the apertures 174 and the horizontal pathways 188 through the flow media pad 170. The larger the pressure differential between the control plate side of the flexible membrane 190 and the side of the flexible membrane 190 adjacent the capsules 180 and horizontal pathways 188, the more effective the operation of the control plate 200 will be. Releasing the pressure from the control plate 200 as shown in FIG. 12, allows the elastically deformable capsules 180 to resume their undeformed state in which their cross sectional area decreases, unsealing the apertures 174 and the horizontal pathways 188 through the flow media pad 170.

A mid portion of the resin flow path 142, defined by the first cavity 140, is formed by the composite preform 10 and various layers of layup materials located beneath the vacuum bagging film 130. The layup materials include a permeable peel ply 145 located directly on, and extending over, the entirety of the composite preform 10, beyond each of the edges 11, 12, 13 of the composite preform 10, with a downstream portion 144 of the peel ply 145 extending downstream of the downstream edge 11 of the composite preform 10. A layer 147 of permeable flow media is placed over the peel ply 145 and extends beyond the upstream edge of the peel ply 145 to the second end 164 of the flexible infusion spiral 163. The layer 147 of permeable flow media extends to beyond the downstream edge 11 of the composite preform 10 but does not cover the entirety of the downstream portion 144 of the peel ply 145. The peel ply 145 serves to prevent the layer 147 of permeable flow media from sticking to the composite preform 10 and also provides a path for infusion of resin into the composite preform 10, both along the upstream edge 12 of the composite preform 10 and through the upper surface 14 of the composite preform 10. The peel ply 145 also allows volatiles given off during curing of the resin to be drawn away from the composite preform 10. The peel ply 145 also constitutes a permeable flow media, and may suitably be in the form of a PTFE coated fibreglass fabric, or any other permeable peel ply material. The layer 147 of permeable flow media provides a passage for the resin through the first cavity 140 along the top of the composite preform 10, along with a path for the escape of volatiles from the first cavity 140. The layer 147 of permeable flow media may suitably be in the form of a nylon mesh material, or any other highly permeable media enabling passage of resin therethrough.

A downstream portion of the resin flow path 142 comprises a further strip 143 of permeable flow media, the vacuum outlet(s) 113 and vacuum pipe(s) 154. The strip 143 of permeable flow media extends across the downstream edge of the downstream portion 144 of the peel ply 145 and extends further downstream across the vacuum outlet(s) 113. The strip 143 of permeable flow media is typically formed of the same material as the layer 147 of permeable flow media. A gap is located between the layer 147 and strip 143 of permeable flow media.

As shown schematically in FIG. 1, a layer of release film 225 is disposed over the entire lay up, including the actuatable flow media pad 170 and control plate 200, however a hole is cut out of the release film 225 for the control plate 200 to protrude through. The release film 225 (omitted in FIG. 2 and FIG. 3 for clarity) is secured to the tool surface 111 using pieces of sealing tape (not shown). A breather cloth 230 (omitted in FIG. 2 and FIG. 3 for clarity) is laid on top of the release film 225 so as to extend over the entire lay up, including the actuatable flow media pad 170 and control plate 200. A hole is cut out of the breather cloth 230 around the mounting pad 210 for the bayonet fitting 211 on the control plate 200.

The vacuum bagging film 130 extends over the entire layup formed by the composite preform 10, peel ply 145 and layer 147 and strip 143 of permeable flow media, release film 225 and breather cloth 230, as shown in FIG. 1. The vacuum bagging film 130 is sealed relative to the tool surface 111 about the periphery of the vacuum bagging film 130 by way of strips 131 of sealing tape, which may conveniently be in the form of a mastic sealant tape. A small incision in the vacuum bagging film 130 allows the bayonet fitting 211 to be attached to the mounting pad 210.

The vacuum bagging film 130 defines the upper boundary of the resin flow path 142. In the gap located between the layer 147 and strip 143 of permeable flow media, the vacuum bagging film 130 restricts the thickness of the resin flow path 142 between the upper tool surface 111 and vacuum bagging film 130 to the downstream portion 144 of the peel ply 145, which is typically of a reduced permeability as compared to the layer 147 of permeable flow media. All downstream flow of resin is thus restricted through the downstream portion 144 of the peel ply 145, which defines a permeable resin flow control choke.

In use, once the resin infusion system 100 has been assembled as discussed above, the resin supply 141 is heated to bring the resin to a suitable resin infusion temperature. Typically the entire system is heated within an oven 270 that is also used for subsequent curing. The temperature for resin infusion will be dependent upon the resin system utilised, and will typically be selected to provide a suitable viscosity enabling the resin to flow through the resin flow path 142.

At least partial vacuum pressure is applied to the downstream end of the first cavity 140, via the first vacuum source 151 and vacuum outlet(s) 113. A smaller partial vacuum (i.e., a higher absolute pressure) may also be applied to the resin supply 141, by way of a second vacuum source 155 connected to a second vacuum pipe 157, as shown in FIG. 1. Where partial vacuum is applied to the resin supply 141 by the second vacuum source 155, a pressure differential may be maintained between the first vacuum source 151 and second vacuum source 155 such that the absolute pressure at the vacuum outlet(s) 113 applied by the first vacuum source 151 is lower than the absolute pressure at the resin supply 141. In one example, a full vacuum may be applied by the first vacuum source 151 and a higher pressure/lower vacuum may be applied to the second vacuum source 155, thereby providing a pressure differential of the same amount driving resin from the resin supply 141 through the resin flow path 142. Full vacuum pressure may also be applied to the resin supply 141 by the second vacuum source 155 prior to resin infusion to degas the resin.

Maintaining at least partial vacuum on the resin supply ensures at least a partial vacuum is maintained throughout the first cavity 140. Atmospheric pressure (depicted by the arrows 212 in FIGS. 11 and 12) acting on the composite preform 10 through the vacuum bagging film 130, the layer 147 of permeable flow media and the peel ply 145 acts to consolidate the composite preform 10. Under this condition, as the actuatable flow media pad 170 has a high pressure applied to it, the elastically deformable capsules are compressed, sealing off the apertures 174 in the base 171 to the flow of resin in the resin supply pipe 146. A resin flow front 213 is accordingly maintained in the resin supply pipe 146. When it is desired to admit resin into the resin infusion system 100, the pressure is released either fully or partially from the control plate 200, causing the capsules 180 to return to their undeformed configuration, opening the apertures 174 and the horizontal pathways 188. The resin flow front 213 is driven by the difference in pressure between the resin supply pipe 146 and the control plate 200 to advance through the resin infusion inlet 112, through the apertures 174 of the base 171 of the actuatable flow media pad 170 and through the horizontal pathways 188 to the first cavity 140 via the infusion spiral 163. Resin advances through the first cavity 140 along a wave front, through the layer 147 of permeable flow media, which will generally have a greater permeability than both the peel ply 145 and the composite preform 10, thus forming the path of least resistance. Resin passing through the layer 147 of permeable flow media will infuse down through the less permeable peel ply 145 and into the preform 10. Some resin will also flow laterally through the upstream edge 12 of the composite preform 10 and, to a lesser degree, through the opposing side edges 13 of the composite preform 10. Having the downstream edge 11 of the layer 147 of permeable flow media finish short of both the strip 143 of permeable flow media and the downstream portion 144 of the peel ply 145 prevents resin bypassing the preform 10 and simply being drawn through the layer 147 of permeable flow media directly into the vacuum outlet(s) 113. The rate of advance of the resin wave front is further inhibited by forcing the resin to pass downstream longitudinally through a permeable resin flow control choke defined by the downstream portion 144 of the peel ply 145 once it passes the downstream edge 11 of the composite preform 10 and the downstream edge of the layer 147 of permeable flow media.

Once the composite preform 10 has been fully resin infused, the resin infused composite preform 10 may then be cured by gradually elevating the temperature of the oven 270 to a temperature suitable for curing of the resin. Full vacuum is typically maintained on the first vacuum source 151 during the curing process, to ensure the resin infused composite preform 10 remains consolidated and to assist in curing of the resin.

Application of the actuatable flow media pad 170 at the resin infusion inlet 112 of the tool 110 allows the flow of resin into the resin infusion inlet 112 to be controlled via the application of external air pressure. As such, the resin inlet valves of conventional resin infusion systems can be omitted from the resin infusion system 100, potentially saving valuable assembly, disassembly and cleaning time as well as labour and equipment costs. The actuatable flow media pad 170 is a consumable material that can be discarded after a resin infusion process in favour of a fresh pad of actuatable flow media ready for the next resin infusion process.

Figure 13:
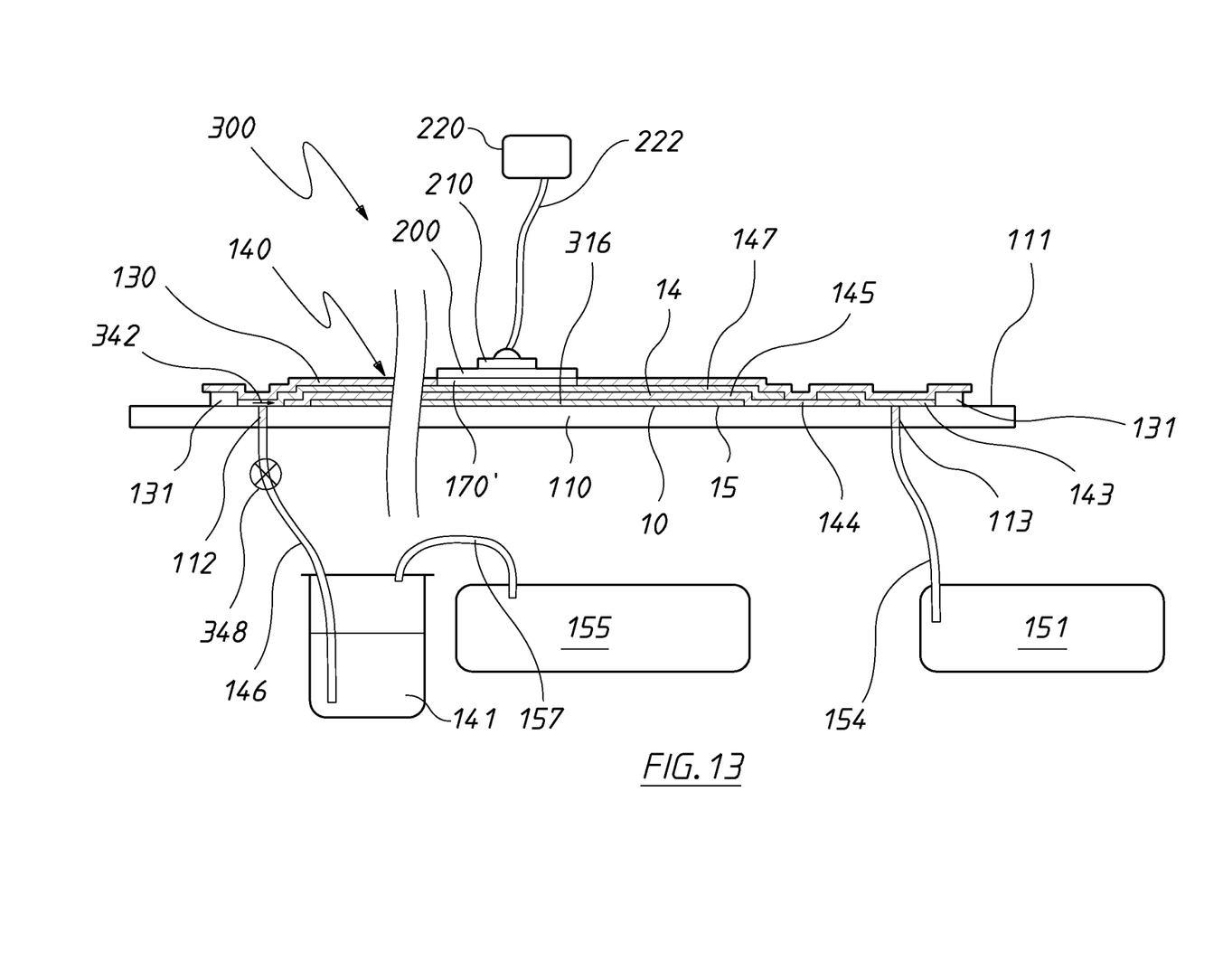
FIG. 13 is a schematic cross-sectional view of a second embodiment of a system for resin infusion of a composite preform.

In a second embodiment of the disclosure shown in FIG. 13, the actuatable flow media pad 170' is applied within the lay up of a conventional resin infusion system 300. The resin infusion system 300 is in many ways the same as the resin infusion system 100. The description of the resin infusion system 100 above and its operation above applies also to the resin infusion system 300, with the exception of the differences in the resin infusion system 300 compared with the resin infusion system 100 described below.

The resin infusion system 300 does not include an actuatable flow media pad 170 and control plate 200 at the resin infusion inlet 112. Instead, the resin supply pipe 146 has a conventional resin inlet valve 348 disposed therein for opening and closing the resin supply pipe 146 to the flow of resin therethrough and into the resin infusion inlet 112.

The composite preform 10 has a locally non-uniform thickness as measured between the upper and lower surfaces 14, 15. Particularly, in the arrangement depicted, the portion 316 of the composite preform 10 has a thickness that is significantly greater than an average thickness of the composite preform 10. In this embodiment, the thicker portion 316 of the composite preform 10 has an increased thickness as a result of being provided with additional plies of reinforcing material to provide local structural features of the specific part being fabricated. For example, the additional plies can form 'padup' regions at locations of the preform 10 at which fasteners will be received in the resulting composite component. Such portions of composite preforms having a locally increased thickness generally have a higher volume of resin per unit of preform surface area once resin infused, given the increased thickness of preform and thus resin. However, such thicker portions are more susceptible to resin starvation if the resin does not impregnate through the entire thicker portion 316, as will be discussed further below.

A flow path 342 extends from a resin supply 141, through the first cavity 140, the composite preform 10 and to the first vacuum source 151. An upstream portion of the flow path 342 comprises the resin supply pipe(s) 146 and resin infusion inlet 112 extending through the tool 110. A mid portion of the flow path 342, defined by the first cavity 140, is formed by the composite preform 10 and various layers of layup materials located beneath the vacuum bagging film

130. The layup materials include the permeable peel ply 145 and a layer 147 of the permeable flow media as described in the resin infusion system 100. The layer 147 of permeable flow media provides a passage for the resin through the first cavity 140 along the top of the composite preform 10. However, to assist the flow of resin into the thicker portion 316 of the composite preform 10, the layer 147 of permeable media is locally replaced by the actuatable flow media pad 170'. A control plate 200 is bonded to an upper surface of the actuatable flow media pad 170' as in the resin infusion system 100. The control plate 200 includes a mounting pad 210 for a bayonet fitting to be connected to a high temperature hose that is in turn connected to an external pressurised air supply. The control plate 200 protrudes through a hole cut in the release film 225 (omitted in FIG. 13 for clarity) and the mounting pad 210 protrudes through a hole cut in the breather cloth 230 (omitted in FIG. 13 for clarity). A small incision in the vacuum bagging film 130 (not shown in FIG. 13) allows the bayonet fitting to be attached to the mounting pad 210.

The actuatable flow media pad 170' can be actuated as described with respect to the resin infusion system 100 above during the resin infusion process to control the permeability of the actuatable flow media pad 170' and thereby control the flow of resin through to the thicker portion 316 of the composite preform 10. The resin flow front advancing through the first cavity 140 can be locally influenced by making appropriate changes to the permeability of the actuatable flow media pad 170', providing the ability to manipulate the infusion to best saturate the thicker portion 316 of the preform 10 that might otherwise be at risk of developing dry spots.

Figure 14:
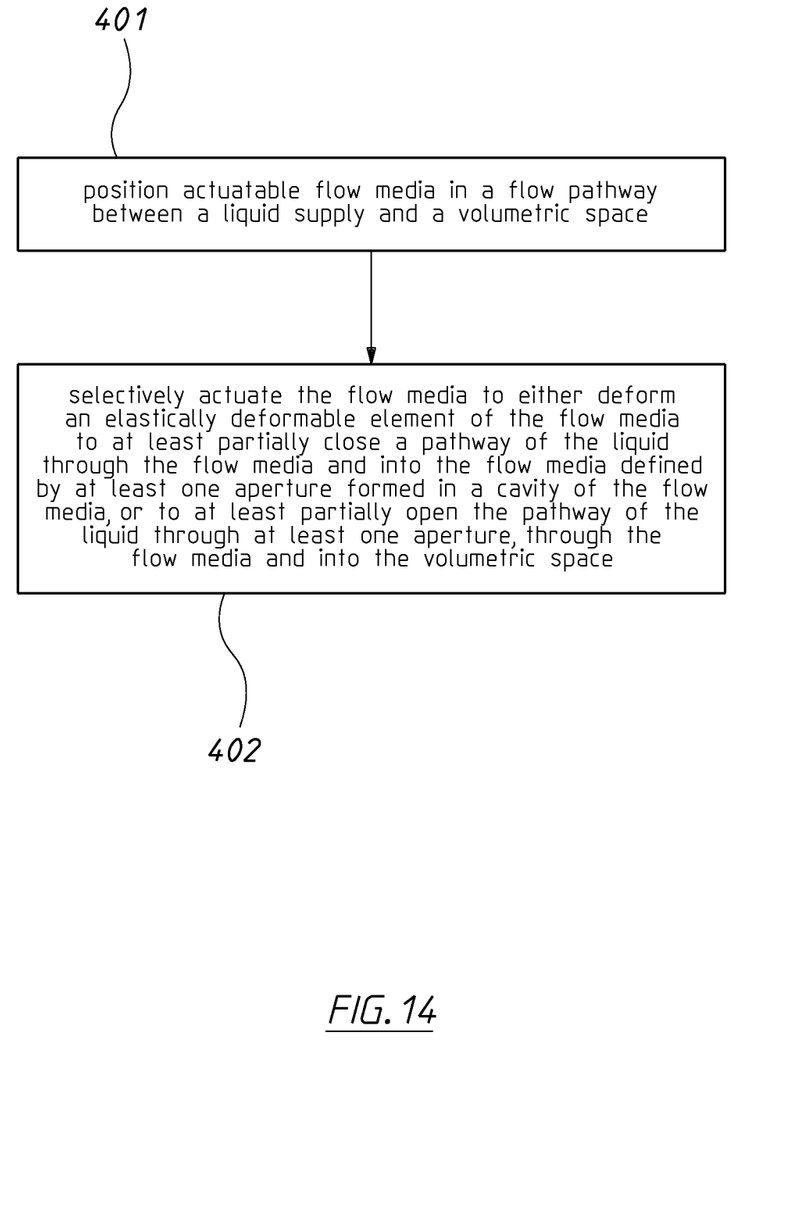
FIG. 14 is a flow chart of an exemplary method of controlling a flow rate of a liquid entering a volumetric space from a liquid supply using an actuatable flow media.

A general method of controlling a flow rate of a liquid entering a volumetric space from a liquid supply using an actuatable flow media is shown schematically in FIG. 14. At block 401, the actuatable flow media is positioned in a flow pathway between the liquid supply and the volumetric space. At block 402, the flow media is selectively actuated to either deform the capsule to at least partially close a pathway of the liquid into and through the actuatable flow media defined by at least one aperture formed in a cavity of the flow media or to at least partially open the pathway of the liquid through the at least one aperture, through the flow media and into the volumetric space.

Clause 1. An actuatable flow media for the control of a flow rate of a liquid through the actuatable flow media, the actuatable flow media comprising:

a base having at least one cavity formed therein, at least one aperture formed in the cavity defining a liquid flow path for the entry of liquid into or exit of liquid from the flow media;

a flexible membrane arranged in spaced relation with the base and defining a liquid flow path through the flow media; and an elastically deformable element arranged in the cavity and extending between the base and the flexible membrane for actuation between at least a first configuration in which the capsule is substantially undeformed and the liquid flow path through the at least one aperture is open and a second configuration in which the capsule is substantially deformed and the liquid flow path through the at least one aperture is closed.

Clause 2. An actuatable flow media as claims in Clause 1, wherein the elastically deformable element is a capsule.

Clause 3. An actuatable flow media as claimed in Clause 2, wherein the cavity includes an annular sealing lip surrounding the at least one aperture.

Clause 4. An actuatable flow media as claimed in Clause 2 or Clause 3, wherein the elastically deformable element is deformable against the annular sealing lip to close the pathway through the at least one aperture.

Clause 5. An actuatable flow media as claimed in any one of Clauses 1 to 4, wherein the elastically deformable element has an upper end attached to the flexible membrane and a lower end attached to the base at an attachment region in the cavity.

Clause 6. An actuatable flow media as claimed in Clause 5, wherein the at least one aperture comprises a plurality of apertures arranged around the attachment region of the elastically deformable element.

Clause 7. An actuatable flow media as claimed in any one of Clauses 1 to 6, wherein the base includes at least one support element extending between the base and the flexible membrane.

Clause 8. An actuatable flow media as claimed in any one of Clauses 1 to 6, wherein the flow media includes a plurality of the cavities, each cavity of the plurality of cavities being arranged to receive one of the elastically deformable elements.

Clause 9. An actuatable flow media according to Clause 1 or Clause 2, wherein the elastically deformable element is generally ovoid in shape.

Clause 10. An actuatable flow media according to Clause 1, wherein the base includes at least one groove formed therein to provide flexibility thereto.

Clause 11. An actuatable flow media system, comprising an actuatable flow media as claimed in any one of the preceding claims and further comprising a control element for selectively applying pressure to the flexible membrane and the elastically deformable capsule to vary the elastically deformable element configuration between at least the first configuration and the second configuration to thereby control a flow rate of a liquid flowing through the flow media.

Clause 12. An actuatable flow media system as claimed in Clause 11, wherein the control element comprises a control plate arranged to apply a compressive force to the flexible membrane under an externally applied pressure.

Clause 13. An actuatable flow media system as claimed in Clause 11, further including a perimeter seal between the flow media flexible membrane and the control plate.

Clause 14. An actuatable flow media system as claimed in any one of Clauses 10 to 13, wherein the liquid is resin and the system is arranged to control the flow rate of the resin through the actuatable flow media and into a volumetric space of a composite preform.

Clause 15. An actuatable flow media system as claimed in Clause 14, further comprising a tool surface having a resin supply fitting upon which the at least one aperture of the actuatable flow media is arranged for the control of a flow rate of resin flowing through the resin supply fitting into the at least one aperture and through the actuatable flow media.

Clause 16. A method of controlling a flow rate of a liquid entering a volumetric space from a liquid supply using an actuatable flow media, the actuatable flow media comprising a base having at least one cavity formed therein, at least one aperture formed in the cavity defining a pathway therethrough for the passage of liquid into or from the actuatable flow media, and an elastically deformable element arranged in the cavity for actuation between at least a first configuration in which the elastically deformable element is substantially undeformed and the liquid flow path through the at least one aperture is open and a second configuration in which the elastically deformable element is substantially deformed and the liquid flow path through the at least one aperture is closed; the method comprising positioning the actuatable flow media in a flow pathway between the liquid supply and the volumetric space, and selectively actuating the actuatable flow media to either deform the elastically deformable element to at least partially close the pathway of the liquid through the aperture and into the flow media or to release pressure on the elastically deformable element to at least partially open the pathway of the liquid through the at least one aperture, through the flow media and into the volumetric space.

Clause 17. A method as claimed in Clause 16, wherein the actuatable flow media further includes a flexible membrane spaced from the base and having an upper surface, the elastically deformable element of the flow media being adapted to extend between the base and the flexible membrane, and wherein the step of selectively actuating the flow media comprises:

sealing a control element to the upper surface of the flexible membrane and selectively applying and releasing external air pressure between the control element and the flexible membrane to respectively compress and decompress the elastically deformable element of the flow media.

Clause 18. A method as claimed in Clause 17, wherein the volumetric space is in a composite preform,
wherein the liquid is resin to be infused into the composite preform, and wherein the step of positioning the actuatable flow media in a flow pathway between the liquid supply and the volumetric space comprises positioning the flow media on the composite preform to control the admission of resin entering the composite preform.

Clause 19. A method as claimed in Clause 18, wherein the volumetric space is in a composite preform, wherein the liquid to be infused is resin to be infused into the composite preform, and wherein the step of positioning the actuatable flow media in a flow pathway between the liquid supply and the volumetric space comprises positioning the flow media over a resin infusion inlet to control the admission of resin entering the composite preform.

Clause 20. A method as claimed in Clause 18 or Clause 19, wherein the step of selectively actuating the flow media comprises selectively applying and releasing the air pressure on the control element to control the rate of advancement of the resin into the flow media and through the composite preform.

Clause 21. A method of infusing resin into a composite preform, comprising:

providing a tool having an upper tool surface;
locating a composite preform on the tool surface;
locating a permeable film on the composite preform;
placing a vacuum bagging film over the tool surface to cover the composite preform, permeable film;
sealing the vacuum bagging film relative to the tool surface to define a sealed resin infusion chamber between the tool surface and the vacuum bagging film;
providing a resin supply having a resin supply inlet;
positioning an actuatable flow media according to any one of claims 1 to 10 on the resin supply inlet such that at least one aperture is located over the resin supply inlet;
providing a resin flow path from the resin supply to the resin infusion chamber through the actuatable flow media;
actuating the flow media to selectively close and open the liquid flow path through the at least one aperture of the flow media so as to control the flow rate of resin flowing into the resin infusion chamber;

applying at least partial vacuum pressure to the resin infusion chamber to draw resin from the resin supply through the resin flow path, infusing the composite preform with resin.

Clause 22. A method of infusing resin into a composite preform, comprising:

providing a tool having an upper tool surface;
locating a composite preform on the tool surface;
locating a permeable film on the composite preform;
locating an actuatable flow media according to any one of Clauses 1 to 10 on the permeable film;
placing a vacuum bagging film over the tool surface to cover the composite preform, permeable film and actuatable flow media;
sealing the vacuum bagging film relative to the tool surface to define a sealed resin infusion chamber between the tool surface and the vacuum bagging film;
providing a resin supply;
providing a resin flow path from the resin supply to the resin infusion chamber, through the actuatable flow media and through the composite preform to a resin outlet;
applying at least partial vacuum pressure to the resin outlet to draw resin from the resin supply through the resin flow path, infusing the composite preform with resin; and
actuating the flow media to selectively close and open the at least one aperture of the flow media so as to control the flow rate of resin flowing through the actuatable flow media and into the composite preform.

Clause 23. A method as claimed in Clause 21 or Clause 22, wherein actuating the flow media comprises selectively applying external air pressure to the flow media to close the resin flow path through the aperture and into or out of the actuatable flow media; and selectively releasing the external pressure on the flow media to open the resin flow path through the at least one aperture and into or out of the flow media.

Clause 24. A method of forming a composite component, comprising resin infusing a composite preform according to the method of any one of Clauses 21 to 23 to form a resin infused composite preform; and curing the resin infused composite preform.

Clause 25. A composite component, fabricated using the actuatable flow media of any one of Clauses 1 to 10 or with the flow media system of any one of claims 11-15.

Persons skilled in the art will appreciate that the above specific embodiments described above are merely examples of the present disclosure. Persons skilled in the art will appreciate that the various features described in relation to different embodiments may be used in combination or as alternatives. Persons skilled in the art will also appreciate various other modifications and alternatives to the embodiments described.

What is claimed is:

1. A method of controlling a flow rate of a liquid entering a volumetric space from a liquid supply using an actuatable flow media, the actuatable flow media comprising a base defining multiple base cavities, at least one aperture formed in each base cavity defining a first liquid flow path into the actuatable flow media, and an elastically deformable element arranged in each base cavity for actuation between at least a first configuration, in which the elastically deformable element is substantially undeformed and the first liquid flow path is open, and a second configuration, in which the elastically deformable element is substantially deformed and the first liquid flow path is closed; the method comprising:

positioning the actuatable flow media in a flow pathway between the liquid supply and the volumetric space; and selectively actuating the actuatable flow media to either deform the elastically deformable elements to at least partially close the first liquid flow path, or to release pressure on the elastically deformable elements to at least partially open the first liquid flow path to permit fluid flow through the at least one aperture and the actuatable flow media into the volumetric space.

2. The method of claim 1, wherein the actuatable flow media further includes a flexible membrane spaced from the base and having an upper surface, the elastically deformable elements of the actuatable flow media being adapted to extend between the base and the flexible membrane, and wherein selectively actuating the actuatable flow media comprises:

sealing a control element to the upper surface of the flexible membrane and selectively applying and releasing external air pressure between the control element and the flexible membrane to respectively compress and decompress the elastically deformable elements of the actuatable flow media.

3. The method of claim 2, wherein selectively actuating the actuatable flow media comprises selectively applying and releasing air pressure on the control element to control a rate of advancement of resin into the actuatable flow media and through a composite preform.

4. The method of claim 2, wherein the elastically deformable element has an upper end attached to the flexible membrane and a lower end attached to the base at an attachment region in the corresponding base cavity.

5. The method of claim 4, wherein the at least one aperture comprises a plurality of apertures arranged around the attachment region of the elastically deformable element.

6. The method of claim 1, wherein the elastically deformable element comprises a capsule.

7. The method of claim 1, wherein the at least one base cavity includes an annular sealing lip surrounding the at least one aperture.

8. The method of claim 7, wherein the elastically deformable element is deformable against the annular sealing lip to close the first liquid flow path.

9. A method of infusing resin into a composite preform, comprising:

providing a tool having an upper tool surface;
locating a composite preform on the upper tool surface;
locating a permeable film on the composite preform;
placing a vacuum bagging film over the upper tool surface to cover the composite preform and the permeable film;
sealing the vacuum bagging film relative to the upper tool surface to define a sealed resin infusion chamber between the upper tool surface and the vacuum bagging film;
providing a resin supply having a resin supply inlet;
positioning an actuatable flow media on the resin supply inlet, the actuatable flow media including:
a base defining multiple base cavities;
at least one aperture formed in each base cavity defining a first liquid flow path from the resin supply inlet into the actuatable flow media, the at least one aperture being located over the resin supply inlet;
a flexible membrane arranged in spaced relation with the base and defining a second liquid flow path through the actuatable flow media into the infusion chamber; and
an elastically deformable element arranged in each base cavity and extending between the base and the flexible membrane for actuation between at least a first configuration, in which the elastically deformable element is substantially undeformed and the first liquid flow path is open, and a second configuration in which the elastically deformable element is substantially deformed and the first liquid flow path is closed;
providing a resin flow path from the resin supply to the sealed resin infusion chamber through the actuatable flow media;
actuating the actuatable flow media to selectively close and open the first liquid flow path to control a flow rate of resin flowing into the sealed resin infusion chamber; and
applying at least partial vacuum pressure to the sealed resin infusion chamber to draw resin from the resin supply through the resin flow path, thereby infusing the composite preform with resin.

10. The method of claim 9, wherein actuating the actuatable flow media comprises:

selectively applying external air pressure to the actuatable flow media to close the first liquid flow path; and
selectively releasing external pressure on the actuatable flow media to open the first liquid flow path.

11. The method of claim 9, wherein the elastically deformable element comprises a capsule.

12. The method of claim 9, wherein the at least one base cavity includes an annular sealing lip surrounding the at least one aperture.

13. The method of claim 12, wherein the elastically deformable element is deformable against the annular sealing lip to close the first liquid flow path.

14. The method of claim 9, wherein the elastically deformable element has an upper end attached to the flexible membrane and a lower end attached to the base at an attachment region in the corresponding base cavity.

15. A method of infusing resin into a composite preform, comprising:

providing a tool having an upper tool surface;
locating a composite preform on the upper tool surface;
locating a permeable film on the composite preform;
locating an actuatable flow media on the permeable film, the actuatable flow media including:
a base defining multiple base cavities;
at least one aperture formed in each base cavity defining a first liquid flow path for entry of liquid into or exit of liquid from the actuatable flow media;
a flexible membrane arranged in spaced relation with the base and defining a second liquid flow path through the actuatable flow media; and
an elastically deformable element arranged in each base cavity and extending between the base and the flexible membrane for actuation between at least a first configuration, in which the elastically deformable element is substantially undeformed and the first liquid flow path is open, and a second configuration in which the elastically deformable element is substantially deformed and the first liquid flow path is closed;
placing a vacuum bagging film over the upper tool surface to cover the composite preform, permeable film, and actuatable flow media;

sealing the vacuum bagging film relative to the upper tool surface to define a sealed resin infusion chamber between the upper tool surface and the vacuum bagging film;

providing a resin supply;

providing a resin flow path from the resin supply to the sealed resin infusion chamber, through the actuatable flow media and through the composite preform, to a resin outlet;

applying at least partial vacuum pressure to the resin outlet to draw resin from the resin supply through the resin flow path, thereby infusing the composite preform with resin; and actuating the actuatable flow media to selectively close and open the first liquid flow path, thereby to control the a rate of resin flowing through the actuatable flow media and into the composite preform.

16. The method of claim 15, wherein actuating the actuatable flow media comprises:

selectively applying external air pressure to the actuatable flow media to close the first liquid flow path; and selectively releasing external pressure on the actuatable flow media to open the first liquid flow path.

17. The method of claim 15, wherein the at least one aperture comprises a plurality of apertures arranged around the attachment region of the elastically deformable element.

18. The method of claim 15, wherein the elastically deformable element comprises a capsule.

19. The method of claim 15, wherein the at least one base cavity includes an annular sealing lip surrounding the at least one aperture.

20. The method of claim 15, wherein the elastically deformable element has an upper end attached to the flexible membrane and a lower end attached to the base at an attachment region in the corresponding base cavity.

* * * * *